United States Patent [19]

Montino et al.

[11] 4,039,317

[45] Aug. 2, 1977

[54] PROCESS FOR THE PREPARATION OF SILVER POWDER

[75] Inventors: Franco Montino, Casale Monferrato (Alessandria); Luigi Colombo, Arona (Novara), both of Italy

[73] Assignee: Montedison Fibre S.p.A., Milan, Italy

[21] Appl. No.: 623,912

[22] Filed: Oct. 20, 1975

[30] Foreign Application Priority Data

Oct. 22, 1974 Italy .................................. 28641/74

[51] Int. Cl.$^2$ ............................................. C22B 11/04
[52] U.S. Cl. .................................. 75/.5 A; 75/118 R
[58] Field of Search .............................. 75/.5 A, 118

[56] References Cited

U.S. PATENT DOCUMENTS

| 2,734,821 | 2/1956 | Schaufelberger | 75/.5 A X |
| 2,814,564 | 11/1957 | Hayden | 75/.5 A X |
| 3,694,254 | 9/1972 | Blumenthal | 75/.5 A X |
| 3,833,351 | 9/1974 | Neskora et al. | 75/.5 A |
| 3,850,612 | 11/1974 | Montino et al. | 75/.5 A X |

FOREIGN PATENT DOCUMENTS

49-1153   1/1974   Japan

*Primary Examiner*—L. Dewayne Rutledge
*Assistant Examiner*—E. L. Weise
*Attorney, Agent, or Firm*—Stevens, Davis, Miller & Mosher

[57] ABSTRACT

A process is disclosed for preparing silver powders with a controlled apparent density wherein an aqueous silver oxide suspension is treated with hydrogen at a temperature between 60° and 115° and under a partial hydrogen pressure of between 5 and 25 atmospheres. The aqueous silver oxide suspension may be additioned with one or more alkali metal, alkaline earth metal, or silver sulphides. Further the aqueous silver oxide suspension may be additioned with one or more silver salts soluble in water or made soluble by complexing with ammonia, such as ammoniacal silver sulphate, silver nitrate or ammoniacal silver nitrate.

8 Claims, No Drawings

PROCESS FOR THE PREPARATION OF SILVER POWDER

The present invention relates to a process for preparing metal silver powder. More particularly, it relates to a process for preparing metal silver powder with a controlled apparent density, with a good homogeneity of the granules, and with an apparent density varying from 0.3 to 3 g/cc.

Silver powder, used as such or in admixture with other metals and/or metal oxides, has a variety of applications, for instance in the catalyst field and in a field of powder metallurgy.

In the catalyst field, silver powder is used for, amongst others, oxidation reactions (e.g., oxidation of ethylene to ethylene oxide, propylene to propionaldehyde, etc.)

In the field of powder metallurgy, the silver powder is mainly used for preparing electrical contacts based on pure silver or, preferably, in admixture with varying percentages of other metals and/or metal oxides (cadmium, nickel, cadmium oxide, etc.)

Still another use for silver powder is that of silver-nickel formulations used for the manufacture of electrodes employed in fuel cells.

It is well known that, depending on the use for which it is intended, the silver powder must satisfy certain specific requirments, especially with regard to apparent density. For example, for catalytic uses a silver powder is preferred which has a low apparent density, while in powder metallurgy a silver powder is preferred which has a high apparent density. Hence follows the desirability of providing a technology that allows one to obtain silver powders with an apparent density controlled within sufficiently wide limits as to be able to produce a range of such powders best suited for specifically different applications.

Processes already known to be suitable for producing a silver powder are:
  physical processes based on vaporization of the silver metal and subsequent condensation at a low temperature (e.g., electric arc vaporization, plasma spray flame);
  chemical processes involving the reduction of silver oxide or silver salts (e.g., with formaldehyde, ferrous sulphate, or other reducing substances) and the thermal decomposition of the silver salts or oxide; and
  electrolytic processes.

Such previously known processes do not, however, solve the problem of the control of the apparent density of the silver powder. In fact, with the physical processes in general there are obtained the highest apparent densities, with the electrolytical processes medium apparent densities, while with the chemical processes are obtained the lowest apparent densities.

Thus, the main object of this invention is that of providing a simple and cheap process for preparing silver powders having a controlled apparent density varying over a sufficiently wide range.

It has now been found (in accordance with the present invention) that if aqueous silver oxide suspensions are subjected to reduction under hydrogen pressure, by suitably varying the operating conditions it is possible to obtain silver powders having the desired characteristics in relationship to the uses for which they are intended.

More particularly, it has been found that if to the aqueous silver oxide suspension one adds an alkali metal sulphide, an alkaline earth metal sulphide, or silver sulphide, one promotes the obtention of a silver powder having a low apparent density. On the other hand, if the reduction of the silver oxide is conducted in the presence of a quantity of silver in the form of a salt which is soluble or is made soluble by complexing with ammonia, one promotes the obtention of a silver powder having a high apparent density.

The foregoing and other objects of this invention are attained by providing a process for preparing silver powders with a controlled apparent density, wherein an aqueous suspension of silver oxide is treated with hydrogen at a temperature between 60° and 115° C, and at a partial hydrogen pressure between 5 and 25 atmospheres.

In carrying out the process, the starting silver oxide may be prepared according to any known method, for instance by precipitation with soda or caustic soda from an aqueous solution of silver nitrate.

According to a preferred embodiment of the process, an aqueous suspension of silver oxide is prepared having a solids content between 10 and 200 grams per liter of suspension.

The reducing treatment with hydrogen of the suspension thus prepared is conducted in a stainless steel autoclave fitted with a stirrer and a heating system. The autoclave is loaded with the suspension and is brought up to the desired reduction temperature, that is, up to a temperature between 60° and 115° C. The hydrogen pre-heated to the reduction temperature is fed into the autoclave at a pressure between 5 and 25 atm., and preferably between 10 and 20 atm. The temperature in the autoclave is maintained until there is no more drop in pressure.

In general, the reduction times vary from 10 to 40 minutes, depending on the degree of turbulence of the motion of the fluid in the autoclave and on the temperature.

In the event one wishes to obtain a silver powder of low apparent density, the aqueous silver oxide suspension, before being loaded into the autoclave, is additioned with one or more alkali metal, alkaline earth metal or silver sulphides. Preferably silver sulphide, sodium sulphide or potassium sulphide is additioned. For this purpose a colloidal solution of silver sulphide, for instance one obtained by the addition of sodium sulphide to diluted ammoniacal silver sulphate $Ag_2(NH_3)_4SO_4$, is especially desirable. The sulphide is added to the aqueous silver oxide suspension in quantities corresponding to 15–50 mg of S per 100 g of Ag as oxide. In this way, silver powders are obtained having an apparent density between 0.3 and 1 g/cc.

In the event one wishes to obtain a silver powder of high apparent density, before being loaded into the autoclave the aqueous silver oxide suspension is additioned with one or more silver salts, either soluble or made soluble by complexing with ammonia. Preferably there is added ammoniacal silver sulphate, silver nitrate or ammoniacal silver nitrate. If a soluble silver salt is used, the addition must be made at a ratio of 0.5 – 5 g of soluble Ag per 100 g of Ag as oxide. If a soluble ammoniacal salt is used, the addition must be made at a ratio of 100 –1000 g of soluble Ag per 100 g as oxide. In this way, silver powders are obtained having an apparent density between 1 and 3 g/cc.

If desired, the process according to this invention may also be carried out with an aqueous silver oxide suspension in which is present contemporaneously a soluble silver salt and a sulphide.

At the end of the reduction with the hydrogen, and after cooling down, the autoclave is discharged. The silver powder thus obtained is filtered, washed with water until the ions present have disappeared, and finally dried.

The most significant advantages offered by the process of this invention may be thus summarized:
short reaction times;
the possibility of obtaining silver powders having a controlled apparent density over the whole interval of 0.3 –3 g/cc, by varying the operating conditions; and
a good homogeneity of shape and dimensions of the silver powder particles.

The present invention will now be further illustrated by the following non-limiting examples:

EXAMPLE 1

57 g of $Ag_2O$, humid by water (corresponding to 34.7 g of $Ag_2O$), and obtained by precipitation from an $AgNO_3$ solution with the stoichiometric quantity of NaOH, were suspended in 600 cc of water.

The silver oxide suspension thus obtained was transferred into a 2-liter autoclave made of AISI 316 stainless steel, fitted with an anchor stirrer driven by a magnetic coupling at a speed of 400 r.p.m. and also provided with an electric resistance heater.

After elimination of the air with nitrogen, the autoclave was brought, under stirring, to the temperature of 110° C, whereupon hydrogen was introduced up to a pressure of 20 atm.

The absorption of hydrogen stops practically after 15 minutes. Thereupon the autoclave was brought down to room temperature and the powder was collected, filtered, washed with water, and dried.

The silver powder thus obtained showed an apparent density of around 1 g/cc, while the examination under the electron microscope showed that the powder consisted of granules having a mean diameter between 0.2 and 5$\mu$.

EXAMPLE 2

60.9 of $Ag_2O$, humid by water (corresponding to 34.7 g of $Ag_2O$), and obtained by precipitation as in Example 1, were suspended in 500 cc of water.

To this suspension was added a colloidal solution of $Ag_2S$ which was obtained by dissolving 75 mg of $Ag_2SO_4$ in 100 cc of water, subsequently adding 0.08 cc of $NH_4OH$ (16M) and then adding, under stirring, 57.6 mg of $Na_2S.9H_2O$ (corresponding to 7.5 mg of S) dissolved in 5 cc of water. Thus, the silver oxide suspension contained 23 mg of S per 100 g of Ag as oxide. This suspension was transferred into a 2-liter autoclave according to the procedures described in Example 1. Thereupon, under stirring, the suspension was heated up to a temperature of 65° C and 20 atm. of hydrogen were added.

The absorption of the hydrogen stops practically after 35 minutes.

The silver powder thus obtained, after filtering, washing, and drying, showed an apparent density of 0.46 g/cc and examination under the electron microscope showed that the powder consisted of granules having a mean diameter around 0.1$\mu$.

EXAMPLE 3

39.1 g of $Ag_2SO_4$ were suspended in 300 cc of water. Then under stirring, there were added 35 cc of $NH_4OH$ (16 M). The solution thus obtained was combined with a suspension of 6.1 g of $Ag_2O$, humid by water (corresponding to 3.6 g of $Ag_2O$), in 300 cc of water.

The $Ag_2O$ suspension was then additioned with $Ag_2(NH_3)_4SO_4$ at a rate of 800 g Ag as soluble ammoniacal salt per 100 g of Ag as oxide.

The mixture thus obtained was treated with hydrogen in the autoclave according to the same procedures as that of Example 1.

After 18 minutes a silver powder was obtained which, upon filtering, washing and drying, showed an apparent density of 2.46 g/cc. Examination under the electron microscope showed the powder to consist of granules with a mean diameter varying from 0.5 to 3$\mu$.

EXAMPLE 4

0.78 g of $AgNO_3$ were dissolved in 600 cc of water. Into the solution thus obtained were suspended 55.1 g of $Ag_2O$, humid by water (corresponding to 32.3 g of $Ag_2O$). By operating in this manner, there was obtained an aqueous $Ag_2O$ suspension in which the soluble silver salt is present in a ratio of 1.66 g of Ag as soluble salt per 100 g of Ag as $Ag_2O$.

This suspension was treated in the autoclave in the same way as described in Example 1, except that the temperature was 100° while the hydrogen pressure amounted to 15 atm. After 13 minutes there was obtained a silver powder which, upon filtering, washing and drying, showed an apparent density of 2.75 g/cc. Examination under the electron microscope showed that this powder consisted of granules having a mean diameter varying from 1 to 4$\mu$.

What is claimed is:
1. A process for preparing silver powders with a controlled apparent density, wherein an aqueous silver oxide suspension is treated with hydrogen in an autoclave, characterized in that the aqueous silver oxide suspension is additioned with one or more alkali metal, alkaline earth metal or silver sulphides and/or with one or more silver salts soluble or made soluble by complexing with ammonia.
2. A process according to claim 1, wherein the treatment with hydrogen is carried out over a period of between 10 and 40 minutes.
3. A process according to claim 1 wherein the treatment with hydrogen is carried out at a temperature between 60° and 115° C and under a partial hydrogen pressure of between 5 and 25 atmospheres.
4. A process according to claim 1, wherein the sulphide is added to the aqueous silver oxide suspension in a quantity equal to 15 – 50 mg of S per 100 g of Ag as oxide.
5. A process according to claim 1, wherein the aqueous silver oxide suspension is additioned with a sulphide selected from the class consisting of silver sulphide, sodium sulphide and potassium sulphide.
6. A process according to claim 1, wherein a soluble silver salt is added at the rate of 0.5 – 5 g of soluble Ag per 100 g of Ag as oxide.
7. A process according to claim 1, wherein a silver salt made soluble by complexing with ammonia is added at the rate of 100 – 1000 g of soluble Ag per 100 g of Ag as oxide.
8. A process according to claim 1, wherein the silver salt is selected from the class consisting of ammoniacal silver sulphate, silver nitrate and ammoniacal silver nitrate.

* * * * *